May 6, 1969 R. A. SEDERQUIST 3,442,618
METHOD FOR PRODUCING HYDROGEN FROM HYDROGEN-CONTAINING FEEDSTOCKS
Filed Aug. 4, 1965

INVENTOR.
RICHARD A. SEDERQUIST
BY
Charles A. Warren

United States Patent Office 3,442,618
Patented May 6, 1969

3,442,618
METHOD FOR PRODUCING HYDROGEN FROM HYDROGEN-CONTAINING FEEDSTOCKS
Richard A. Sederquist, Newington, Conn., assignor to United Aircraft Corporation, East Hartford, Conn., a corporation of Delaware
Filed Aug. 4, 1965, Ser. No. 480,528
Int. Cl. C01b 1/18
U.S. Cl. 23—212
12 Claims

ABSTRACT OF THE DISCLOSURE

There is disclosed a method for producing hydrogen from hydrogen-containing carbonaceous feedstocks at relatively low water-to-carbon molar ratios. The heated stream of feedstock and water is passed through a bed of dehydrogenation catalyst which is heated to provide a pronounced thermal incline from the inlet end to the outlet end, the latter having a temperature of about 370 to 650° centigrade. The thermal incline is selected to increase progressively the amount of feedstock reacted with increasing temperature along the thermal incline for essentially complete conversion of the feedstock and to avoid carbon forming reactions.

The catalyst thus converts essentially all of the feedstock to methane, hydrogen and carbon oxides in the product stream. The product stream is then passed through an additional bed of dehydrogenation catalyst maintained at a temperature of about 700 to 900° centigrade to effect conversion of the methane to carbon oxide products and hydrogen.

---

The present invention relates to the conversion of hydrogen-containing carbonaceous feedstocks and, more particularly, to a novel method and apparatus for obtaining hydrogen from hydrogen-containing carbonaceous feedstocks by catalytic steam reforming thereof.

Because of a desire to produce electric current from relatively small power plants, there have been considerable efforts in the area of fuel cells wherein the energy generated by an oxidation-reduction chemical reaction at spaced electrodes is directly converted into electrical energy to operate in an external circuit between the electrodes devices which provide a load. Although some fuel cells have been produced which utilize relatively impure hydrogen or other oxidizable fuels, generally pure hydrogen has been recognized as the preferred fuel and its coreactant has generally been oxygen or oxygen in air.

Although various techniques have been proposed for converting hydrocarbons and other hydrogen-containing carbonaceous feedstocks into hydrogen for use in such cells, generally primary emphasis has been placed upon catalytic conversion or reformation at relatively high temperatures; i.e. about 700° centigrade. In such catalytic reforming of fuels, carbon formation can rapidly limit the catalyst activity and it has been proposed to use relatively high water to carbon molar ratios to minimize this tendency. However, such high molar ratios result in inefficient operation which becomes aggravated as heavier hydrocarbons are employed. Alternatively, highly specialized and expensive catalysts have been utilized and special fuels have also been suggested.

It is an object of the present invention to provide a novel method for the low-temperature conversion of a hydrogen-containing carbonaceous feedstock substantially entirely to methane and other gaseous products while substantially eliminating the production of carbon.

It is also an object of the present invention to provide such a method which employs conventional reform catalysts at low water to carbon molar ratios and is readily adapted to a compact and highly efficient low-temperature reactor.

Another object is to provide such a method in combination with a high-temperature reactor wherein the methane is thereafter immediately converted into carbon oxide products and hydrogen.

Yet another object is to provide an apparatus which is relatively compact, rugged and relatively highly efficient for the practice of the aforementioned method.

Other objects and advantages will be readily apparent from the following detailed specification and claims and the attached drawings wherein:

It has now been found that the foregoing and related objects may be readily attained by a method in which a hydrogen-containing carbonaceous feedstock or fuel containing 5 to 16 carbon atoms is admixed with water in a molar ratio of about 2.0 to 5.0:1 and then heated to provide a gaseous stream at a temperature of about 205 to 510° centigrade. The gaseous stream is passed through a bed of a dehydrogenation catalyst which is heated to provide a thermal incline from the inlet end to the outlet end thereof with the temperature at the outlet end being about 370 to 650° centigrade. The thermal incline is selected with respect to the gaseous stream, catalyst and conditions of operation to provide increasing amounts of feedstock or fuel reacted with increasing temperature along said incline and to avoid substantially the carbon-forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

During the passage through the bed of catalyst, substantially all of the feedstock is converted to products which substantially entirely comprise methane, hydrogen and carbon oxide products.

More particularly, it has now been discovered that, by closely controlling the amount of feedstock or fuel reacted at a given temperature for a particular feedstock, the carbon-forming reactions heretofore described may be substantially, if not completely, eliminated. This phenomenon may best be understood by reference to FIGURE 3 of the attached drawings where $\beta$ is the quality of hydrogen produced, i.e.

moles of hydrogen actually produced
―――――――――――――――――――――――――――――――
moles of hydrogen theoretically available from a given amount of fuel reacted (assuming no methane production)

The designation $\alpha$ represents the fraction of fuel reacted. Thus, the curves illustrate the fact that the amount of hydrogen generated by the low temperature reaction decreases with increasing amounts of fuel reacted. As will be readily appreciated, generally the fraction of fuel reacted will increase with temperature.

Figure 3:
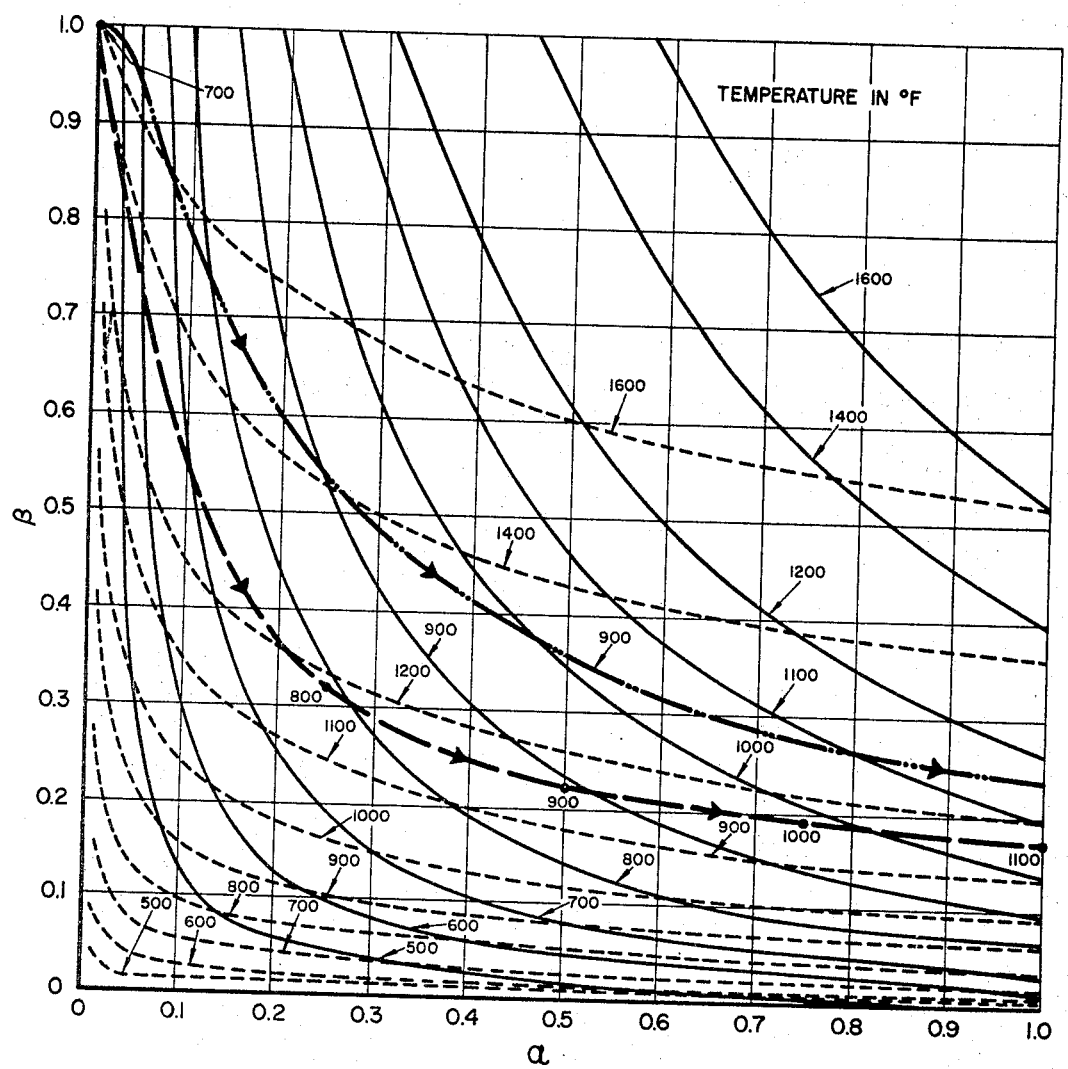
FIGURE 3 is a graph presenting carbon-forming plots, a reaction plot according to the present invention, and a plot of a process falling without the scope of the present invention.

The dashed lines shown in FIGURE 3 represents plots of the effect of the fraction of fuel reacted upon the carbon-forming reaction:

$$CH_4 \rightarrow C + 2H_2$$

More particularly, the curves establish the points below which the methane cracking reaction will occur at a given temperature.

The solid line curves are plots of the effect of the fraction of fuel reacted based upon the carbon-forming reaction:

$$CO_2 + 2H_2 \rightarrow C + 2H_2O$$

Above the solid line curves, the composition of product is such that carbon will be produced. Although these curves are primarily constructed for the $CO_2$ equation above, the curves of the two CO reactions are essentially the same:

$$2CO \rightarrow CO_2 + C$$
$$CO + H_2 \rightarrow C + H_2O$$

so that it has been found that the $CO_2$ reaction may be used for all intents and purposes as demonstrating the model for determining the thermal inclines of the present invention.

If the bed of dehydrogenation catalyst is maintained within a range closely approximating an average temperature or constant temperature as opposed to a pronounced thermal incline of greater than 100° centigrade, it has been found that the reaction path will cross the upper carbon-forming boundary, i.e., that at which the carbon dioxide and carbon monoxide reactions take place, thus producing elemental carbon which will tend to deteriorate the activity of the catalyst. This can be seen by reference to the dashed-dotted line which crosses the 900° curve when the fraction of fuel reacted is between 0.2 and 0.3.

In the present invention, a thermal incline from the inlet to the outlet end of the bed is established whereby the temperature is increased as the fraction of feedstock or fuel reacted increases while at the same time staying below the curve or curves for the carbon oxide reactions and above the curve for the methane cracking reaction. This characteristic is shown by the heavy dashed line which can be observed to remain between the dashed lines and the solid lines as the temperature increases in a typical reaction path.

The carbon formation boundaries may be readily predicted assuming the following:

(a) Unreacted heavy hydrocarbon fuel may be treated as an inert in the system; and
(b) The methane reform and water gas shift reactions are the basis for the theoretical reaction paths.

It has been observed duuring various studies that the stream passing through the bed of catalyst does not achieve methane reforming equilibrium until the hydrocarbon fuel is nearly completely reacted, although the stream does maintain the water gas shift equilibrium throughout the temperature incline.

Based upon the foregoing assumptions the following reactions are considered.

Reform reaction:

(1) $\quad CH_4 + H_2O \rightarrow CO + 3H_2$

Shift reaction:

(2) $\quad CO + H_2O \rightarrow CO_2 + H_2$

Carbon forming reactions:

(3) $\quad CO + H_2 \rightarrow C + H_2O$
(4) $\quad CO_2 + 2H_2 \rightarrow 2H_2O$
(5) $\quad 2CO \rightarrow C + CO_2$
(6) $\quad CH_4 \rightarrow C + 2H_2$ In striving to obtain chemical equilibrium, the foregoing carbon forming equations will proceed to the right or left depending upon the relative concentrations of products in the reaction system as compared to the concentrations predicted at their chemical equilibrium condition. Since the concentrations of products are controlled primarily by other factors, the equations can do little more than proceed in one or the other directions so long as a given concentration of gases is imposed at a given point. Too low a concentration of products or too high a concentration of reactants drives the reaction to the right. Thus, there may be derived the following equilibrium equations:

(1a) $\quad K_{p_1} = \dfrac{(y_{CO})(y_{H_2})^3}{(y_{CH_4})(y_{H_2O})} p^2$ (2a) $\quad K_{p_2} = \dfrac{(y_{CO_2})(y_{H_2})}{(y_{CO})(y_{H_2O})}$ (3a) $\quad K_{p_3} = \dfrac{(y_{H_2O})}{(y_{CO})(y_{H_2})} \dfrac{1}{p}$ (4a) $\quad K_{p_4} = \dfrac{(y_{H_2O})^2}{(y_{CO_2})(y_{H_2})^2} \dfrac{1}{p}$ (5a) $\quad K_{p_5} = \dfrac{(y_{CO_2})}{(y_{CO})^2} \dfrac{1}{p}$ (6a) $\quad K_{p_6} = \dfrac{(y_{H_2})^2}{(y_{CH_4})} p$ The reformer conversion parameters are defined as follows when $\phi$ is equal to or greater than 2:

Steam/carbon ratio:

$$\phi = \text{moles } H_2O / \text{moles } C$$

Fuel conversion:

$\alpha$ = Fraction of fuel converted to $CO_2$, CO or $CH_4$ $$\alpha = CO_2 + CO + CH_4 / CO_2 + CO + CH_4 + n(CH_m)_n$$

Shift conversion:

$\psi$ = Fraction of CO converted to $CO_2$ $$\psi = CO_2 / CO_2 + CO$$

Reform conversion:

$\beta$ = Fraction of $CH_4$ converted to $CO_2$ or CO $$\beta = \dfrac{\theta - \dfrac{\left(2 - \dfrac{m}{2}\right)}{(3+\psi)}}{1 - \dfrac{\left(2 - \dfrac{m}{2}\right)}{(3+\psi)}}$$

where $$\theta = CO_2 + CO / CO_2 + CO + CH_4$$

(It will be noted that $\beta$ defined as above is equal to the previously described shorter definition thereof.)

The mole fractions of each component in the system are as follows:

(7) $\quad y_{H_2} = \dfrac{\alpha\beta\left[1 + \dfrac{m}{2} + \psi\right]}{\alpha\left[2\beta + 2(1-\beta)\dfrac{\left(2-\dfrac{m}{2}\right)}{(3+\psi)} - 1 + \dfrac{m}{2}\right] + \dfrac{(1-\alpha)}{n} + \phi}$ (8) $\quad y_{CO_2} = \dfrac{\alpha\psi\left[\beta + (1-\beta)\dfrac{\left(2-\dfrac{m}{2}\right)}{(3+\psi)}\right]}{\text{Same as denominator above}}$ (9) $\quad y_{CO} = \dfrac{\alpha(1-\psi)\left[\beta + (1-\beta)\dfrac{\left(2-\dfrac{m}{2}\right)}{(3+\psi)}\right]}{\text{Same as denominator above}}$

(10)
$$y_{CH_4} = \frac{\alpha(1-\beta)\left[1-\frac{\left(2-\frac{m}{2}\right)}{(3+\psi)}\right]}{\text{Same as denominator above}}$$

(11)
$$y_{H_2O} = \frac{\phi - \alpha(1+\psi)\left[\beta + (1-\beta)\frac{\left(2-\frac{m}{2}\right)}{(3+\psi)}\right]}{\text{Same as denominator above}}$$

Equations 1a and 2a can be solved for the methane shifting equilibrium state for a given fraction of fuel reacted, $\alpha$, as follows:

$$\beta, \psi = \beta, \psi(\alpha)$$

Thus, it can be seen that, for any given value of $\alpha$ there exists a unique solution for $\beta$ and $\psi$.

In order to understand the concepts of the present invention, it is convenient to describe two theoretical classes of reactions. The first class relates only to the heavy hydrocarbon breakdown and steam reforming process wherein the carbon involved in these reactions comes only from the local reaction of heavy hydrocarbon fuel, $d\alpha$. This process involves the breakdown and steam reforming of the fuel to products of composition of $\beta$ and $\psi$ according to the methane shifting equilibrium:

$$\beta, \psi = \beta, \psi(\alpha)$$

The second class or reactions shall be related only to changes in composition of the stream excluding the breakdown and steam reforming process. The carbon involved in these reactions comes from the product previously formed, i.e., from the net value of $\alpha$ and not from the breakdown process $d\alpha$. This process involves the attempt of the system to come to equilibrium.

Class I Reactions.—Products formed by the net reaction of heavy hydrocarbon fuel and water, $d\alpha$ (Ia) $CH_4 + H_2O \rightleftharpoons CO + 3H_2$
(Ib) $CO + H_2O \rightleftharpoons CO_2 + H_2$ Class II Reactions.—Attempt by the stream to come to equilibrium from products already formed ($\alpha$=const.)

(IIa) $CH_4 + H_2O \rightleftharpoons CO + 3H_2$
(IIb) $CO + H_2O \rightleftharpoons CO_2 + H_2$ The basic premise of the general solution of a modified hydrocarbon-steam reaction path, conveniently referred to as the modified methane shifting equilibrium reaction path, is that reaction IIa is prohibited in the presence of unreacted heavy hydrocarbon fuel. Ideally only at a value of $\alpha=1$ would the reaction come to equilibrium. It has been observed that this methanation reaction, however, does being to occur at a point near complete reaction but its effect upon the calculations herein and the thermal incline may essentially be disregarded. The remaining reactions Ia, Ib, and IIb, are allowed to come to equilibrium based upon the fraction of fuel reacted. The breakdown and steam reforming process thus produces equilibrium products by reactions Ia and Ib and the stream is allowed to achieve shift equilibrium by reaction IIb. The build-up of hydrogen in the stream because of the restriction on reaction IIa produces excess amounts of CO by reaction IIb. When the system finally collapses to equilibrium, heat is released by both the formation of methane by reaction IIa and by the production of carbon dioxide by reaction IIb.

By use of the present concept, the modified methane shifting equilibrium reaction path may be evaluated analytically by integrating the methane formed during each reaction, $d\alpha$ (since the methane is not allowed to change by reaction IIa) and allowing the rest of the system (with methane and unreacted fuel treated as inerts) to come to shift equilibrium.

In order to facilitate calculations, a machine solution is desirably used to calculate methane shifting and the resulting integrated modified methane shifting equilibrium reaction path. Calculation of this modified path is achieved by starting at $\alpha=0$, where $\beta$ and $\psi$ are both 1.0 and the program steps by increments to $\alpha=1$. For a given value of temperature, pressure and the program calculates the composition according to the methane shifting equilibrium. This is compared with the composition for the previous step and the average methane composition is taken between the two steps, multiplied by the amount of fuel reacted in the increment, $d\alpha$, and added to the methane summed for all previous increments. With this summed value of methane and the amount of unreacted fuel (both being treated as inerts) the composition of the stream is calculated on the basis of the water gas shift equilibrium.

Mathematically, the moles of methane for total carbon atoms in the system are:

$$CH_4 = \int_0^\alpha (1-\beta)\left[1 - \frac{2-\frac{m}{2}}{3+\psi}\right] d\alpha$$

where $\beta, \psi = \beta, \psi(\alpha)$ are derived from the Methane Shifting Equilibrium.

With the amount of $CH_4$ and unreacted fuel known the shift reaction can be solved where the adjusted composition is:

$\beta, \psi = \beta, \psi(\alpha, CH_4)$      Equation 2A

These values of $\beta$ and $\psi$ represent the composition on the Modified Methane Shifting Equilibrium reaction path.

Equations 3a–6a can be evaluated on the basis of calculated compositions along the reaction path. When the value of the right side of the equation becomes less than its corresponding equilibrium constant, there is a tendency to produce carbon in the system. It should be noted that Equations 3a, 4a and 5a predict carbon at about the same point on the path as was heretofore explained with respect to the solid line curves in FIGURE 3. Mathematically the reaction path is represented by a plane in a three-dimensional $\alpha\beta\psi$ space, but as previously explained this may be readily graphically presented by discounting $\psi$ and using only $\alpha$ and $\beta$ as is set forth in FIGURE 3 for simplified explanation.

Thus, based upon the theoretical predictions for the carbon forming boundaries as to a given fuel and a given set of operating conditions including catalyst, steam-carbon ratio, temperature range desired, pressure and space velocity, a thermal incline may readily be determined which will avoid the carbon forming boundaries or regions.

The foregoing analyses, which have been explained with respect to a hydrocarbon feedstock, may also be derived with respect to other types of hydrogen-containing carbonaceous feedstocks such as alcohols, ethers or aldehydes. Similar predictions and equations must be derived to accommodate the oxygen or other element introduced into the system which must be considered from the standpoint from hydrogen-producing and consuming reactions.

The catalyst bed providing the thermal incline generally should have an inlet temperature of about 205 to 510° centigrade, and preferably about 370 to 510° centigrade. The outlet or end temperature of the thermally inclined bed should be maintained at a temperature of about 370 to 650° centigrade, and preferably about 535 to 625° centigrade. As will be readily appreciated, the concept of the present invention may be combined with a high temperature reactor to convert the methane substantially to hydrogen and carbon oxide products. In such instance, the inlet temperature of the second catalyst bed which may be continuous and contiguous with the first reactor or thermally inclined bed is maintained at about the outlet temperature of the thermally inclined bed. In order to effect the desired conversion of the methane, the outlet temperature of the high temperature reactor should be about 700 to 990° centigrade, and preferably about 700 to 815° centigrade.

The pressure within the system may vary from atmospheric to about 500 pounds per square inch absolute and is preferably about 100 to 400 pounds per square inch absolute. The space velocity will depend upon the activity of the catalyst and the temperatures and pressures employed in the system. Generally, the space velocity may vary between 500 and 5,000 hours$^{-1}$, and is preferably about 1,500 to 3,500 hours$^{-1}$.

The mixture of feedstock and water is desirably raised to a temperature of about 205 to 510° centigrade prior to passage into the catalyst bed and is preferably about 370 to 510° centigrade.

Various hydrocarbonaceous fuels may be employed in the present process including paraffins, olefins, aromatics and alcohols containing about 5 to 16 carbon atoms. The preferred fuels are saturated hydrocarbons containing 6 to 10 carbon atoms and combinations thereof, either alone or with relatively small amounts of unsaturated hydrocarbons. Conveniently, hexane, heptane, octane, nonane, decane and mixtures thereof may be employed.

Because of the favorable equilibrium factors in the present invention, a relatively low steam to carbon molar ratio may be employed; i.e., the stoichiometric ratio of 2.0 to 5.0:1. The term "dehydrogenation catalyst" as used herein is intended to refer to any of the conventional steam reforming catalysts such as nickel, cobalt and platinum.

Figure 1:
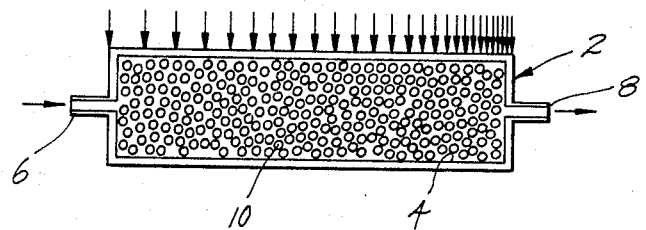
FIGURE 1 is a diagrammatic representation of apparatus embodying the present invention.

Referring now in detail to the attached drawings, FIGURE 1 diagrammatically illustrates a conversion device embodying the present invention. A reactor housing generally designated by the numeral 2 provides a reaction chamber 4 and has an inlet 6 and an outlet 8. Catalyst 10 extends throughout the reaction chamber 4. As shown by the arrows which increase in frequency from left to right, heat is supplied to the reactor housing 2 and thereby the catalyst 10 in increasing intensity from the end adjacent the inlet 6 to the end adjacent the outlet 8 so as to establish a thermal incline therein as contemplated by the present invention.

Figure 2:
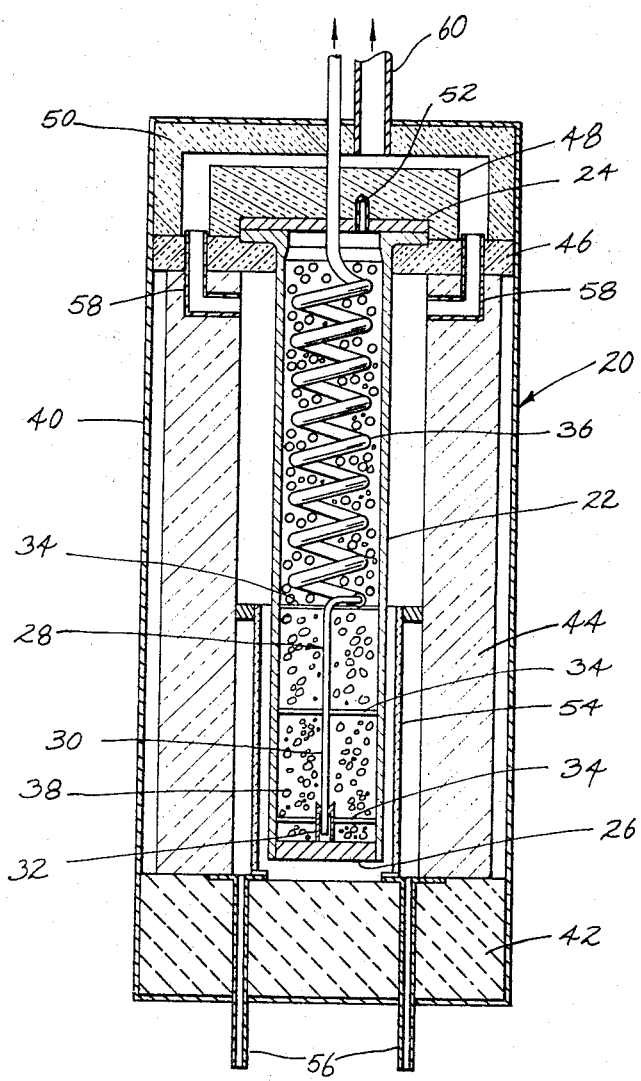
FIGURE 2 is a partially diagrammatic elevation view in section of a combined low-temperature converter and high-temperature reformer embodying the concepts of the present invention.

In FIGURE 2, there is partially illustrated an apparatus for practicing the present invention wherein the thermally inclined conversion to methane is coupled with high-temperature conversion. More particularly, a housing generally designated by the numeral 20 has supported therein a reaction tube 22 of generally cylindrical nature with end caps 24, 26. Supported within the tube 22 is a conduit element generally designated by the numeral 28 with the lower end portion 30 thereof received within the porous support element 32 on the bottom cap 26 and extending upwardly therefrom with support elements 34 holding it in spaced relationship with respect to the wall of the tube 22 for a distance from the bottom cap 26. The conduit element 28 then has a coiled portion 36 extending upwardly within the cylindrical tube 22 which extends through the upper cap 24 and thence outwardly through the wall of the housing 20. Catalyst 38 is disposed throughout the interior of the reaction tube 22.

The housing 20 includes a metal shell 40, a bottom insulating member 42, a generally cylindrical insulating member 44 spaced outwardly from the reaction tube 22, a plate-like insulating member 46, and the insulating block 48, and an upper insulating member 50. A conduit or feed tube 52 extends into the housing 20 at the insulating block 48 and thence through the top cap 24 to supply a gaseous stream of hydrogen-containing carbonaceous feedstock and water at the upper end of the reaction tube 22 and to the catalyst 38 packed therein.

The lower portion of the reaction tube 22 and thereby the catalyst 38 therein is heated by combustion of a suitable fuel mixture at the cylindrical porous burner element 54 which is located in the spacing between the reaction tube 22 and the cylindrical insulating element 44. The fuel mixture is fed in through the feed conduits 56 which extend upwardly through the bottom insulating member 42. The combustion gases pass upwardly about the exterior of the reaction tube 22 and outwardly through the conduits 58 and the spring provided between the upper insulating member 50 and the insulating block 48 to the vent tube 60.

During operation of the apparatus, it can be seen that the gaseous mixture of hydrogen-containing feedstock and water entering through the feed tube 52 passes downwardly through the bed of dehydrogenation catalyst 38 to the bottom of the reactor tube 22. It then enters into the porous member 32 and passes upwardly in countercurrent flow to the entering gaseous mixture through the conduit member 28. As it travels through the coiled portion 36, it is in heat exchange with the catalyst bed 38 in the upper portion of the reactor tube 22 so as to impart heat thereto while at the same time losing a portion of the sensible heat which it has obtained during the catalytic treatment. Thus, the stream of reaction products, and to some extent the stream of combustion products, cooperate to establish a thermal incline from the inlet end of the reaction tube 22 to adjacent the burner element 54 in accordance with the concepts of the present invention.

Thus, it can be seen from the foregoing detailed description that the pre-reaction or low-temperature reaction of the feedstock and steam to produce a methane-rich stream may be provided within the initial portion of a single reactor and catalyst bed with the high-temperature primary reaction occurring at the final portion thereof. Generally, the predetermined operating conditions, particularly when employing fresh catalyst, exhibit a tendency toward carbon formation at the beginning of operation due to the taking place of most of the prereaction near the inlet or at the very beginning of the catalyst bed as a result of the high activity of the catalyst. As will be appreciated, the carbon formation in such a situation occurs by reason of the fact that the desired thermal incline for increasing fraction of fuel reaction is substantially obviated by the high activity of the catalyst. However, it has been shown both analytically and experimentally that the system compensates for the problem by adjusting through catalyst deterioration as a result of carbon formation so that more of the length of the catalyst bed is required for completion of the desired prereaction. Thus, an adjusted steady state is evolved which reliably indicates the required catalyst volume for a given hydrocarbon fuel and reactor design. It will be appreciated that this adjustment or compensation does not require decay or deterioration of the overall system and that only a finite amount of catalyst is involved. This factor has been readily proven in operation of prototype systems for over 500 hours without detection of carbon buildup within the catalyst.

Exemplary of the efficacy of the present invention are the following specific examples:

Example 1

To an apparatus constructed similarly to that illustrated in FIGURE 1 was fed a mixture of water and a hydrocarbon fuel designated "JP–150," a Udex Raffinate manufactured by Texaco. The JP–150 fuel has a hydrogen to carbon ratio of 0.180 and contains 1.8 percent olefins and 0.8 percent aromatics according to A.S.T.M. Test D–1319. Its viscosity at 100° Fahrenheit is 0.73 and its specific gravity (A.P.I.) is 63.8°. A distillation analysis on the Fahrenheit scale is as follows:

| | Degrees |
|---|---|
| Initial boiling point | 240 |
| 10 percent | 267 |
| 20 percent | 270 |
| 50 percent | 284 |
| 90 percent | 306 |
| End point | 335 |

The space velocity was 2,000 hours$^{-1}$ and the water to carbon molar ratio was 2.75. The mixture was preheated to a temperature of 455° centigrade and an electrical heater was used to heat the reactor bed to establish the thermal gradient from inlet to outlet. The catalyst employed was a proprietary nickel catalyst designated "G-56" by the Girdler Catalyst Company.

The pressure in the reactor was 265 pounds per square inch absolute. Thermocouples established that the temperature adjacent the inlet end of the reactor bed was 455° centigrade, that the temperature at the midpoint of the bed was 525° centigrade and that the temperature at the outlet of the reactor bed was 593° centigrade, which temperatures closely approximated design conditions predetermined by analysis of the type hereinbefore described to establish a carbon-free reaction path.

Conventional methane reform and shift equilibrium products were produced over a 500 hour period. During this period complete fuel conversion was achieved, the effluent product composition equaling that predicted by conventional equilibrium calculations. No carbon build-up occurred during the period of operation. Upon disassembly, the catalyst was found to be free from carbon.

The factors found upon analysis of operation are as follows:

$$\tau_{exit} = 593° \text{ centigrade}$$
$$\beta_{exit} = 0.222$$
$$\psi_{exit} = 0.874$$

Example 2

A reactor similar to that illustrated in FIGURE 2 was provided in an overall apparatus including a shift converter and a purifier employing tubes of palladium-silver alloy. The feedstock was again "JP-150" described in Example 1 and at a rate of 0.309 pound per hour and the water feed was at a rate of 1.074 pounds per hour.

The catalyst employed in the tube providing the prereactor and primary reactors was "G-56" a proprietary nickel catalyst made by Girdler Catalyst Company. The catalyst was in the form of pellets ⅛ inch by ⅛ inch and the amount in the prereactor portions was 0.70 pound and the amount in the reactor portion was 0.50 pound.

The apparatus was operated at a pressure of 200 pounds per square inch gauge. After a start-up period of about thirty minutes in which the unit was brought up to temperature and proper operating cycle by the start-up burner and combustion of the hydrocarbon-rich waste gas from the purifier, the apparatus was put on stream. Thermocouples recorded the following temperatures at the points indicated:

| | Deg. C. |
|---|---|
| Bottom end of boiler | 502 |
| Prereactor upper end | 421 |
| Primary reactor entrance | 557 |
| Primary reactor midpoint | 674 |
| Primary reactor bottom end | 771 |

Exiting from the apparatus was a pure hydrogen stream at the rate of 0.071 pound per hour indicating a high degree of conversion efficiency. The above prereactor and reactor temperatures closely approximate the design temperatures of 427° centigrade at the prereactor upper end, 593° centigrade at the primary reactor entrance and 760° centigrade at the primary reactor bottom end. Thus, it can be seen that the method and apparatus of the present invention provide a high degree of thermal efficiency and patentability.

Accordingly, the present invention provides a novel and highly effective method and apparatus for low-temperature conversion of a hydrogen-containing carbonaceous feedstock to a methane-rich stream while substantially eliminating the production of carbon. The method employs conventional steam reforming catalysts at low water to carbon molar ratios and may be readily combined with a high temperature reactor to effect conversion of the methane to carbon oxide products and hydrogen for subsequent shift conversion and purification. If so desired, the apparatus and method may be easily adapted to a highly compact and relatively trouble-free apparatus which is capable of long operation.

Having thus described the invention, I claim:

1. In the method of producing hydrogen from hydrogen-containing carbonaceous feedstocks, the steps comprising: admixing a hydrogen-containing carbonaceous feedstock containing 5 to 16 carbon atoms with water in a water-to-carbon molar ratio of about 2.0–5.0:1; heating said admixture to provide a gaseous stream at a temperature of about 205 to 510° centigrade at a pressure of atmospheric to 500 p.s.i.a.; passing said gaseous stream through a bed of dehydrogenation catalyst; heating said bed of dehydrogenation catalyst to provide a predetermined pronounced thermal incline from the inlet end to the outlet end thereof, the temperature at the outlet end being greater than 100° centigrade above that at the inlet end and about 370 to 650° centigrade, said thermal incline being selected with respect to said gaseous stream, catalyst and conditions of operation to progressively increase the amount of said feedstock reacted with the increasing temperature along said incline for essentially complete conversion thereof and to avoid substantially the carbon forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

said catalyst converting essentially all of said feedstock to products consisting substantially entirely of methane, hydrogen and carbon oxides; and then passing said stream from said first-mentioned bed through an additional bed of dehydrogenation catalyst maintained at a temperature of about 700 to 990° centigrade to effect conversion of the methane in said stream to carbon oxide products and hydrogen.

2. The method in accordance with claim 1 wherein said feedstock is essentially a saturated hydrocarbon.

3. The method in accordance with claim 1 wherein said feedstock contains 6 to 10 carbon atoms.

4. The method in accordance with claim 1 wherein the water to carbon molar ratio is about 2.5–4.0:1.

5. The method in accordance with claim 1 wherein the temperature at said outlet end is about 535 to 625° centigrade.

6. In the method of producing hydrogen from hydrogen-containing carbonaceous feedstocks, the steps comprising: admixing a hydrogen-containing carbonaceous feedstock containing 5 to 16 carbon atoms with water in a water-to-carbon molar ratio of about 2.0–5.0:1; heating said admixture to provide a gaseous stream at a temperature of about 205 to 510° centigrade at a pressure of atmospheric to 500 p.s.i.a.; passing said gaseous stream through a bed of dehydrogenation catalyst; heating said bed of dehydrogenation catalyst to provide a predetermined pronounced thermal incline from the inlet end to the outlet end thereof, the temperature at the outlet end being greater than 100° centigrade above that at the outlet end and about 370 to 650° centigrade, said thermal incline being selected with respect to said gaseous stream, catalyst and conditions of operation to increase progressively the amount of said feedstock reacted with the increasing temperature along said incline for essentially complete conversion thereof and to avoid substantially the carbon-forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

said catalyst converting essentially all of said feedstock to products consisting substantially entirely of methane, hydrogen and carbon oxides, said thermal incline having been predetermined by (A) determining the reaction rate of said catalyst with said feedstock at said water-to-carbon molar ratio, and anticipated conditions of operation, (B) determining the temperatures at which said carbon-forming reactions take place as a function of the fraction of feedstock reacted for said feedstock and conditions of operations, (C) determining the composition of the carbon-free dehydrogenation products from said feedstock as a function of the fraction of feedstock reacted and temperature at the anticipated conditions of operation, and (D) determining the heat required to be supplied to said catalyst bed at a multiplicity of points along the length thereof to provide said carbon-free dehydrogenation products of said feedstock and to avoid said carbon-forming reactions as the fraction of said feedstock reacted increases, said heating of said catalyst bed being in accordance with the determination (D); passing the stream from said first-mentioned bed through a second bed of dehydrogenation catalyst; and heating said second bed to provide a temperature of about 700 to 990° centigrade to effect conversion of the methane in said stream to carbon oxide products and hydrogen.

7. The method in accordance with claim 6 wherein said feedstock is essentially a saturated hydrocarbon.

8. The method in accordance with claim 6 wherein said feedstock contains 6 to 10 carbon atoms.

9. The method in accordance with claim 6 wherein the water to carbon molar ratio is about 2.5–4.0:1.

10. The method in accordance with claim 6 wherein the temperature at said outlet end is about 535 to 625° centigrade.

11. The method in accordance with claim 6 wherein said first-mentioned and second beds of catalyst are portions of a single continuous bed of catalyst.

12. The method in accordance with claim 1 wherein said first-mentioned and additional beds of catalyst are portions of a single continuous bed of catalyst.

References Cited

UNITED STATES PATENTS

| | | | |
|---|---|---|---|
| 2,938,934 | 5/1960 | Williams | 23—210 XR |
| 3,278,452 | 10/1966 | Vorum | 23—212 XR |
| 3,320,182 | 5/1967 | Taylor et al. | 23—212 XR |

OSCAR R. VERTIZ, *Primary Examiner.*

EDWARD STERN, *Assistant Examiner.*

U.S. Cl. X.R.

23—288; 48—196; 252—373